United States Patent
Paulson et al.

(10) Patent No.: US 10,781,978 B2
(45) Date of Patent: Sep. 22, 2020

(54) DETECTION OF PIPELINE EXPOSURE IN WATER CROSSINGS

(71) Applicant: PURE TECHNOLOGIES LTD., Calgary (CA)

(72) Inventors: Peter O. Paulson, Calgary (CA); John A. McIntyre, Calgary (CA)

(73) Assignee: PURE TECHNOLOGIES LTD, Calgary, Alberta (CA)

( * ) Notice: Subject to any disclaimer, the term of this patent is extended or adjusted under 35 U.S.C. 154(b) by 198 days.

(21) Appl. No.: 15/735,455

(22) PCT Filed: Jun. 17, 2016

(86) PCT No.: PCT/CA2016/050717
§ 371 (c)(1),
(2) Date: Dec. 11, 2017

(87) PCT Pub. No.: WO2016/201584
PCT Pub. Date: Dec. 22, 2016

(65) Prior Publication Data
US 2018/0156392 A1 Jun. 7, 2018

Related U.S. Application Data

(60) Provisional application No. 62/181,541, filed on Jun. 18, 2015.

(51) Int. Cl.
*F17D 5/06* (2006.01)
*G01V 9/00* (2006.01)
(Continued)

(52) U.S. Cl.
CPC .................. *F17D 5/06* (2013.01); *G01F 1/86* (2013.01); *G01V 9/005* (2013.01); *F17D 1/08* (2013.01)

(58) Field of Classification Search
CPC .... F17D 5/06; F17D 1/08; G01F 1/86; G01V 9/005
See application file for complete search history.

(56) References Cited

U.S. PATENT DOCUMENTS 4,336,708 A * 6/1982 Hobgood ................. G01M 3/18
374/5
5,142,907 A * 9/1992 Hinkle ................... G01F 1/6847
73/204.12
(Continued)

FOREIGN PATENT DOCUMENTS

DE 10215064 11/2002
WO WO 2015/166429 11/2015

OTHER PUBLICATIONS

Search Report and Written Opinion issued in App. No. PCT/CA2016/050717 (dated 2016).

*Primary Examiner* — Daniel S Larkin
*Assistant Examiner* — Anthony W Megna Fuentes
(74) *Attorney, Agent, or Firm* — Barnes & Thornburg LLP

(57) ABSTRACT

The present invention relates to a method and system of an arrangement of sensors that can be used to detect changes in burial conditions of a pipeline buried under a body of water. The method comprising: obtaining a first temperature of a fluid at a first location; obtaining a second temperature of the fluid at a second location upstream and proximal to the crossing of the body of water; obtaining a third temperature of the fluid at a third location downstream from the crossing of the body of water; generating an estimate of the temperature of the fluid at the third location by establishing the rate of change of temperature of the fluid using the obtained first and second temperature and the distance between the first and second sensors; and identifying pipe exposure when (Continued)

there is a deviation between the estimated temperature and the obtained third temperature.

19 Claims, 8 Drawing Sheets

(51) Int. Cl.
    *G01F 1/86*     (2006.01)
    *F17D 1/08*     (2006.01)

(56) References Cited

U.S. PATENT DOCUMENTS

| | | | |
|---|---|---|---|
| 5,308,162 A | 5/1994 | Amano et al. | |
| 5,321,612 A * | 6/1994 | Stewart | G01V 1/00 374/136 |
| 5,343,737 A | 9/1994 | Baumoel | |
| 5,522,261 A * | 6/1996 | Grover | G01F 1/696 73/204.18 |
| 5,645,348 A * | 7/1997 | Stulen | G01F 1/6847 374/138 |
| 6,243,483 B1 * | 6/2001 | Petrou | F17D 5/00 348/144 |
| 6,243,657 B1 * | 6/2001 | Tuck | G01N 29/2412 702/150 |
| 6,883,369 B1 * | 4/2005 | Myhre | G01F 1/6847 73/204.12 |
| 6,965,320 B1 * | 11/2005 | Casey | F16L 55/48 324/71.2 |
| 2001/0013247 A1 * | 8/2001 | Wilson | G01N 33/2888 73/54.01 |
| 2006/0225507 A1 * | 10/2006 | Paulson | F17D 5/02 73/592 |
| 2007/0084280 A1 * | 4/2007 | Gill | G01F 1/698 73/204.27 |
| 2012/0279316 A1 * | 11/2012 | Gaarder | G01F 1/68 73/861.95 |

* cited by examiner

DETECTION OF PIPELINE EXPOSURE IN WATER CROSSINGS

CROSS REFERENCE TO RELATED APPLICATIONS

This application is a U.S. nationalization under 35 U.S.C. § 371 of International Application No. PCT/CA2016/050717, filed Jun. 17, 2016, which claims the benefit of priority under 35 U.S.C. § 119(e) to U.S. Provisional Patent Application No. 62/181,541, filed Jun. 18, 2015. The disclosures set forth in the referenced applications are incorporated herein by reference in their entireties.

TECHNICAL FIELD

The present invention relates to a method and system of detecting pipeline exposure in the crossing of bodies of water such as streams, rivers, lakes, muskeg and ponds.

BACKGROUND

Pipelines often cross bodies of water such as streams, rivers, lakes, muskeg and ponds. Through the course of time, a pipeline which was buried at the time of installation underneath a covering material may become exposed to the water through flotation, scour, erosion, dredging and other causes. Exposure may include the thinning of the covering material so that the pipeline is either partially or completely exposed to the body of water.

In many cases there is a need to detect such exposure because the change in support of the pipeline may generate stresses on the pipeline material, a condition that can lead to failure of containment of the fluid in the pipeline.

In addition, the process of determining whether the pipeline has been exposed may not be easily executed during inclement weather, flood events or other mitigating circumstances. Also, the use of in-line inspection methods may not provide sufficiently timely information to prevent operational problems for the pipeline.

An ideal method would be able to report such exposure in nearly real time, and would not require installation of equipment along the portion of pipeline crossing the bodies of water.

SUMMARY OF THE INVENTION

According to an embodiment of the invention, there is provided a method and system of an arrangement of sensors that can be used to detect changes in burial conditions of a pipeline buried under a body of water.

According to an embodiment of the invention, there is provided a system for identifying pipe exposure in a crossing of a body of water, the system comprising: a distal upstream sensor at a first location upstream and distal to the crossing of the body of water for obtaining a first temperature of the pipe at the first location; a proximal upstream sensor at a second location upstream and proximal to the crossing of the body of water for obtaining a second temperature of the pipe at the second location; a downstream sensor at a third location downstream from the crossing of the body of water for obtaining a third temperature of the pipe at the third location; and a temperature estimation means for obtaining a temperature rate of change by using the first obtained temperature and second obtained temperature, and estimating the temperature of the pipe at the third location.

According to an embodiment of the invention, there is provided a method for identifying pipe exposure in a crossing of a body of water, the method comprising: obtaining a first temperature of a fluid carried by a pipe at a first location upstream and distal to the crossing of the body of water; obtaining a second temperature of the fluid at a second location upstream and proximal to the crossing of the body of water; obtaining a third temperature of the fluid at a third location downstream from the crossing of the body of water; generating an estimate of the temperature of the fluid at the third location by establishing a rate of change of temperature of the fluid using the obtained first temperature and the obtained second temperature and the distance between the first and second locations; and identifying pipe exposure when there is a deviation between the estimated temperature and the obtained third temperature.

According to an embodiment of the invention, there is provided a method for identifying pipe exposure in a crossing of a body of water, the method comprising: obtaining fluid temperature of a fluid carried in a pipeline from at least two locations along the pipeline and upstream of a underwater pipeline crossing and separated by a distance sufficient to measure small difference in temperature changes; determining a rate of temperature change over the distance between the at least two locations; estimating a temperature of the fluid carried along a pipeline at the location downstream of the underwater pipeline crossing from the product of the rate of temperature change and the distance of the downstream location from a location upstream of the underwater crossing; and identifying pipe exposure when there is a deviation between the estimated temperature of the fluid at the location downstream of the pipeline crossing with an obtained fluid temperature at the location downstream of the pipeline crossing.

DETAILED DESCRIPTION

Figure 1:
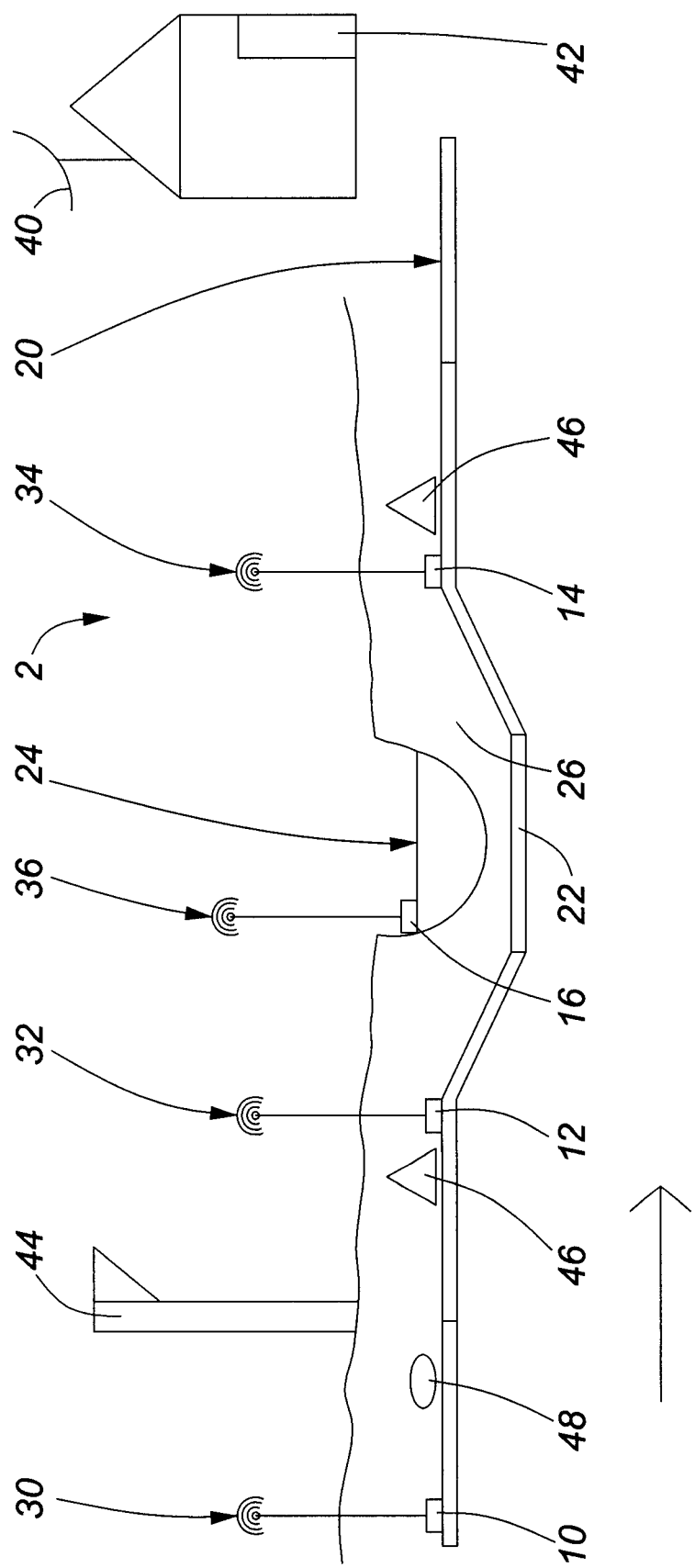
FIG. 1 is a schematic representation of the system for detecting pipeline exposure in the crossing of bodies of water showing a normal condition where the pipeline is buried under the body of water.
Figure 2:
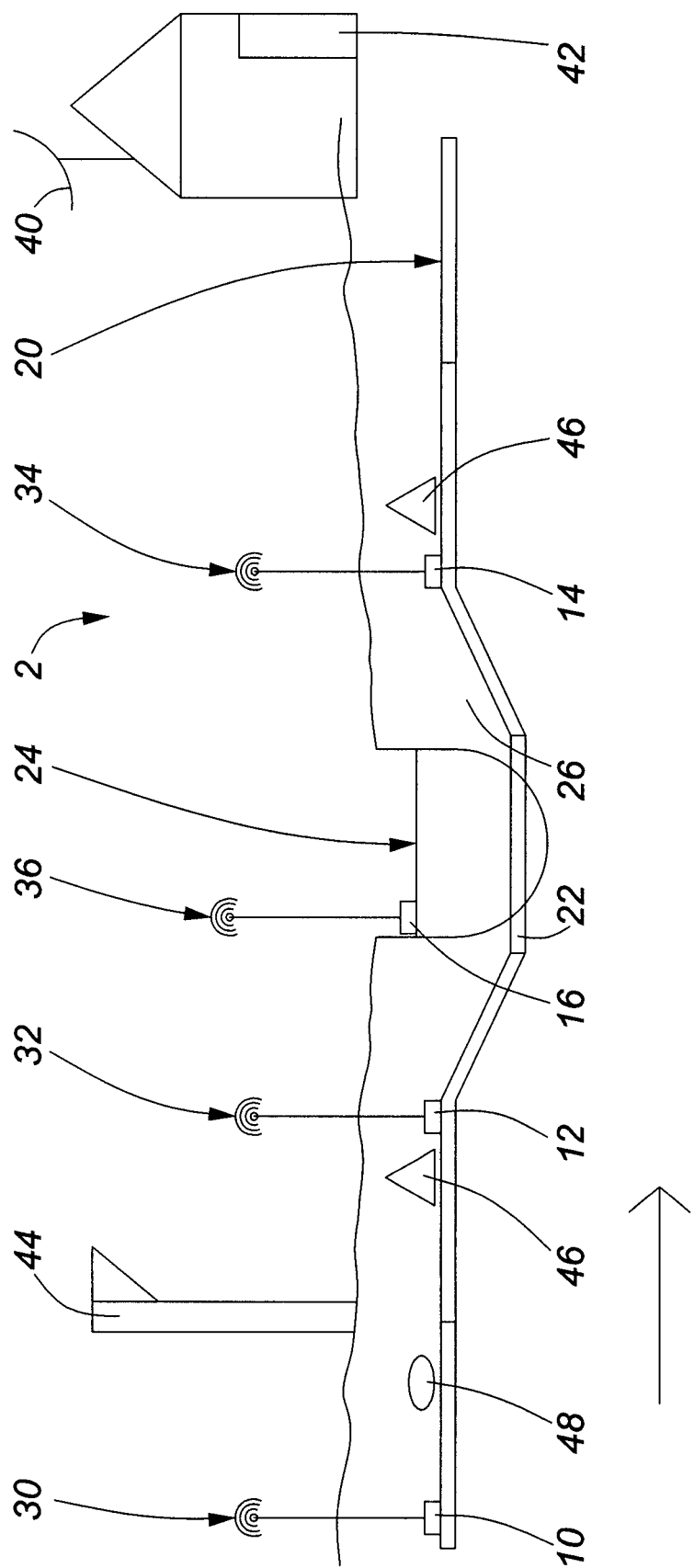
FIG. 2. is a schematic representation of the system for detecting pipeline exposure in the crossing of bodies of water showing an abnormal condition where the pipeline is exposed to the body of water.

A schematic representation of a method and system for detecting pipeline exposure in the crossing of bodies of water is shown in FIGS. 1 and 2. As shown in FIG. 1, the system 2 comprises a plurality of sensors 10, 12, and 14 for measuring the temperature of an underground pipeline 20 for carrying a fluid 22 from an upstream source (not shown) to a downstream destination (not shown) whilst passing under a body of water 24. As shown in FIG. 1, pipeline 20 is buried under a depth of covering material (or sediment) 26. In this condition, the covering material 26 separates the pipeline 20 from the water body 24.

The first sensor 10 is placed at a first location on the pipeline 20 that is upstream and distal to the crossing of the body of water 24 such as streams, rivers, lakes, muskeg and ponds and obtains a first temperature of the pipeline 20 at the first location. The second sensor 12 is placed at a second location on the pipeline 20 that is upstream and proximal to the crossing of the body of water 24 and obtains a second temperature of the pipe at the second location. The distance between the first sensor 10 and the second sensor 12 is a distance sufficient to allow the sensors 10 and 12 to normally detect a temperature difference of at least 0.01° C. between them during normal operation. It will be appreciated that in cases where the rate of temperature change along the pipeline is very small, the distance between sensors 10 and 12 may be increased.

The third sensor 14 is placed at a third location on the pipeline 20 downstream and is separated from the second sensor 12 by a sufficient distance to place it on the pipeline 20 at a position beyond where the pipeline 20 has traversed under the body of water 24. The third sensor 14 obtains a third temperature of the pipeline 20 at the third location.

A water temperature sensor 16 may be placed in close thermal contact with the water body 24 to assist in the interpretation of the information derived from the sensors 10, 12, and 14 by revealing the temperature difference between the water body 24 and the pipeline fluid 22. In an embodiment, the water temperature sensor 16 can be used to generate an estimate of the amount of pipeline 20 exposed to the water body 24.

Each of the sensors 10, 12, 14, and 16, can each include a signal transmission means 30, 32, 34, and 36 respectively for relaying the obtained temperature information or processed information to a site remote from the crossing. Suitable signal receiving means 40 at the remote site for receiving and/or processing the obtained temperature information. Such an arrangement would usefully be able to relay the temperature information, or processed information, to the remote site where alarms could be raised and perhaps action taken. Signal transmission means 30, 32, 34, and 36 could comprise wired or wireless transfer. The system 2 could be powered with mains power, battery power, solar or wind energy as best suits the situation. A computer system 42 is provided for collecting the temperature data, carrying out the instructions (i.e. a computer program) stored on computer readable medium for estimating the temperature of the wall of the pipeline 20 at the third location and determining the degree of deviation the estimated temperature is from the actual temperature at the third location, and for communicating this information to a user, for instance.

Additionally and optionally, video or photographic equipment 44 may be included to provide supporting information about the status of the pipeline 20. Furthermore, acoustic sensors 46 located at any one or all of the first, second and third locations may be provided to reveal debris or rocks impinging the pipeline 20. Each of sensors 10, 12, 14, and 16, can each include a GPS (not shown) to precisely determine location. Additionally, ground temperature sensors (not shown) may also be included for measuring the temperature of the ground in the vicinity of the pipeline 20.

It will be appreciated that the measured temperature of the wall of the pipeline 20 can be considered an approximate reflection of the temperature of the fluid 22 in the pipeline 20. A number of factors will determine the temperature of the fluid 22 in the pipeline 20. For example, a pipeline 20 buried in soil will gradually change the temperature of the soil in which it is buried, and by extension, the temperature of the fluid 22 within the pipeline 20 will also be affected by the ambient temperature of the soil surrounding the pipeline 20. The rate of temperature change of both the soil and of the fluid 22 in the pipeline 20 will be affected by the difference in temperature between the fluid 22 and the soil or surrounding environment, and the thermal conductivity of the wall of the pipeline 20. Other factors that affect the temperature of the fluid 22 in the pipeline include the nature of the fluid 22, such as the specific heat, and the velocity of the fluid 22 through the pipeline 20.

According to an embodiment, the temperature of the wall of pipeline 20 is measured at least at three locations. The first two locations would normally be spaced some distance apart on the "upstream" side of the crossing, and would, to the extent practical, be buried in similar conditions of cover. The purpose of sensors 10 and 12 at the first and second locations is to establish the rate of temperature change over a fixed distance where the pipeline 20 is buried in a known condition of cover. The third sensor 14 measures the temperature of the pipeline 20 at a position located on the downstream side of the body of water 24, and that this third sensor 14 be installed in a manner similar to the first two sensors, with similar burial, contact with the wall of the pipeline 20, and installation attachment.

The first two sensors 10, 12 establish a temperature of the wall of the pipeline 20, and a rate of change of that temperature over a fixed distance is calculated by the computer system 42. This allows the cancellation or recognition of the effects of fluid velocity, specific heat, pipeline wall thermal properties, and the temperature of the fluid 22 within the pipeline 20. As shown in FIG. 1, were the pipeline 20 to be buried is effectively in a non-aqueous environment such as under cover material 26, one would expect the temperature measured at the location of the third sensor 14 to be accurately predicted by applying the rate of change of temperature with distance and calculating the temperature expected at the distance on the downstream side of the crossing.

As shown in FIG. 2, if the environment surrounding the pipeline 20 were to become aqueous (such as seen in a washout condition whereby at least a portion of the cover material 26 is washed out or missing), the temperature at the third sensor 14 will be different than if the environment were to be non-aqueous, simply because the specific heat of dry soil is different than the specific heat of wet soil, and also because the movement of water body 24 past the pipeline 20 would not allow the pipeline 20 to stabilize the temperature of the moving body of water 24 in the same manner as it might were the water to be static around the pipeline 20.

Figure 3:
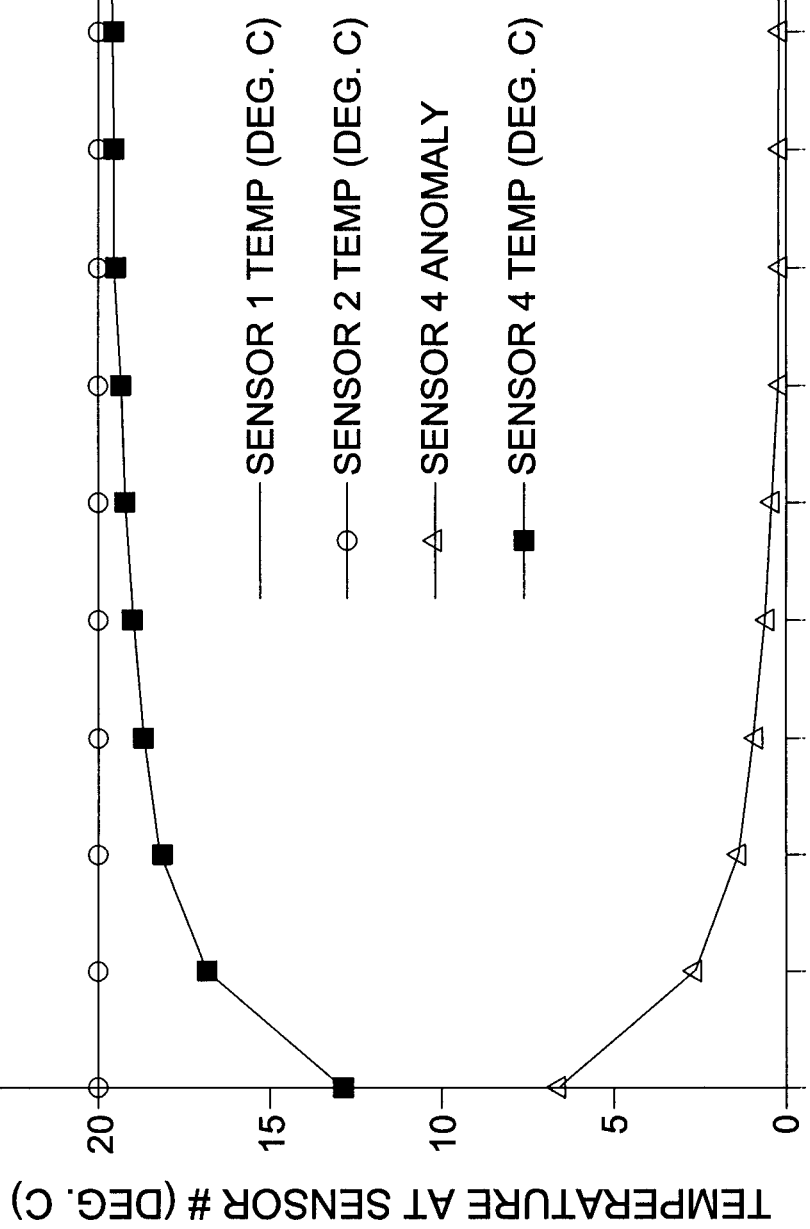
FIG. 3 is a graphical representation showing the effects pipeline temperature when the depth of covering material above the pipeline is reduced and the pipeline is exposed to a body of water that has a temperature colder than that of the fluid contents of the pipeline.

Shown in FIG. 3 is a graphical representation showing the effects pipeline temperature when the surface (i.e. cover material 26) above the pipeline 20 is reduced and the pipeline 20 is exposed to the body of water 24 that has a temperature colder than that of the fluid contents 22 of the pipeline 20. Under normal conditions where the pipeline 20 is buried under sufficient cover material 26, it is expected that the temperatures obtained by sensor 14 would not deviate significantly from the estimated temperature. If the depth of cover of the soil or cover material 26 overlaying the pipeline 20 were to change, then it is expected that the typical rate that water would move over the pipeline 20 would also change, resulting in a different rate of heat transfer between the wall of pipeline 20 and the surrounding wet soil.

In an extreme case, all of the soil or cover material 26 covering the pipeline 20 may be removed in some locations and the temperature of the surrounding water 24 would have a marked effect on the temperature of the fluid 22 passing through the pipeline 20. For example, as shown in FIG. 3, in a situation where the depth of sediment (or cover material 26) over the pipeline 20 is zero, the temperature as measured by sensor 14 is about 13° C. or 7° C. cooler than the temperatures measured by sensors 10 and 12. Thus, by using the three sensors 10, 12, and 14 placed as described, changes in the depth of cover of the soil/sediment or cover material 26 over the pipeline 20 can be detected, even though the product 22 in the pipeline 20 changes in character and the rate of flow of the product 22 in the pipeline 20 may change.

According to an embodiment, the computer 42 develops, and maintains, and accesses a database of historical temperature measurements for all sensors 10, 12, 14, and 16. It will be appreciated that the amount of temperature deviation constituting an anomalous condition could be refined as the behavior of the temperature of the fluid 22 in the pipeline 20 over the seasons becomes better characterized. Additionally, the computer 42 has access topographical, geographical, and geological information across the entire network of pipelines as well as access to local weather conditions. The computer 42 utilizes this additional information to determine whether a particular anomaly or deviation at certain places along the pipeline 20 are more likely than not to be an exposure of the pipeline 20.

According to another embodiment, there is also provided a method to analyze information from at least two sensors to determine the rate of temperature change with distance in the operating pipeline, and to compare the rate of temperature change with distance in the portion of the pipeline preceding the crossing, with the rate of temperature change on either side of the crossing, and further seeking anomalous changes in that rate of change of temperature. This method compensates for the effect of changes in flow within the pipeline, changes of product flowing within the pipeline, changes in the temperature of the product flowing in the pipeline, and the seasonality of the surrounding environment of the pipeline. The method also includes the use of information from optional additional sensor or sensors placed in thermal contact with the water being crossed, and the use of video or other photographic information to assist in the interpretation of the data gathered by the system.

According to another embodiment, where there are multiple crossings of the bodies of water 24, information from various sensors can be reused. For example, sensor 10 can also function as sensor 14. In another embodiment, the system 2 comprises as few as one of each sensor 10 and sensor 12 for calculating the rate of change of the temperature over a fixed distance.

According to another embodiment, there is also provided a method and system comprising two sensors 12 and 14 and a flow meter 48 or plurality of flow meters 48 for determining the rate of flow of the fluid 22 carried in the pipeline 20. In this embodiment, an indication that there may be an exposure of the pipeline 20 can be obtained by examining the readings of the sensors 12 and 14 and flow meter 48. In cases where the readings at sensor 14 are shown to vary despite a constant flow, this would be a considered an anomalous condition requiring further investigation.

While in the embodiments described above, the temperature of the fluid 22 is obtained by taking the measurement of the temperature of the wall of the pipeline 20, it will be appreciated that other methods of measuring the temperature of the fluid 22 in the pipeline are contemplated. These methods include various invasive or non-invasive temperature sampling methods.

Example 1

Figure 4:
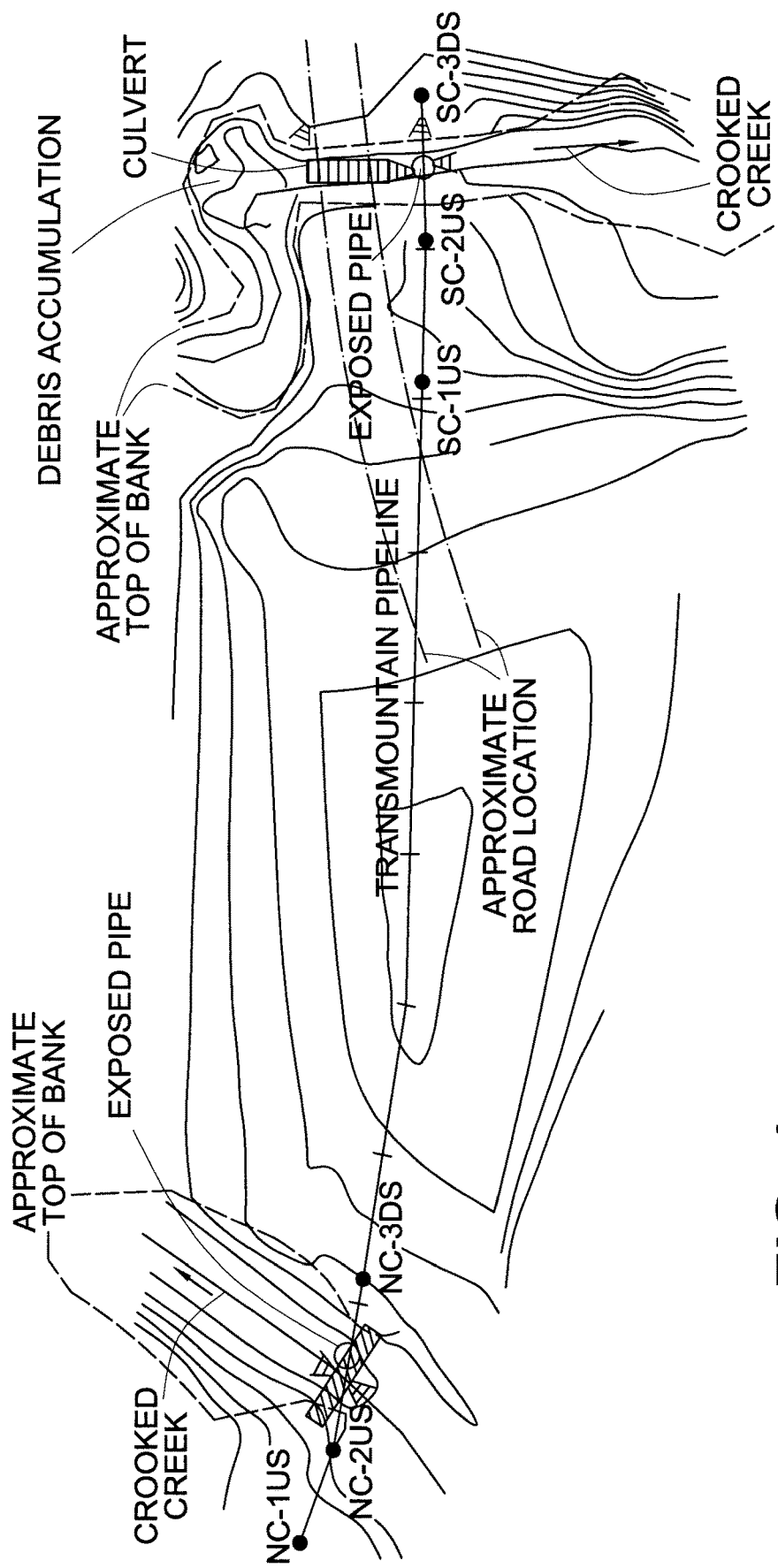
FIG. 4 is topographical map of two sites (a northern crossing NC and a southern crossing SC) of a commercial pipeline where showing the placement of the two systems according to an embodiment of the invention.

Two systems according to an embodiment of the invention were installed along two sites of a commercial pipeline in the province of British Columbia. As shown in FIG. 4, the systems surround two water crossings (a northern crossing NC and a southern crossing SC). The southern crossing site has sensors labeled as SC-1 US (Upstream), SC-2 US, and SC-3 DS (Downstream) relative to the flow within the pipeline. The approximate distance between SC-1 US and SC-2 US is about 10 meters. The approximate distance between SC-2 US and SC-3 DS is about 12 meters.

Each site had the sensor units placed directly on the pipe with adhesive and the covered with protective coatings.

Each sensor comprises a temperature sensor capable of sensing temperature changes of about 0.002° C. and an acoustic sensor.

The sensors were wired directly to a monitoring unit that contains analog/digital electronics, cellular links, satellite links, batteries, a solar panel, and a controller. The controller was programmed to check in from time to time to relay information about what it has detected.

Figure 5:
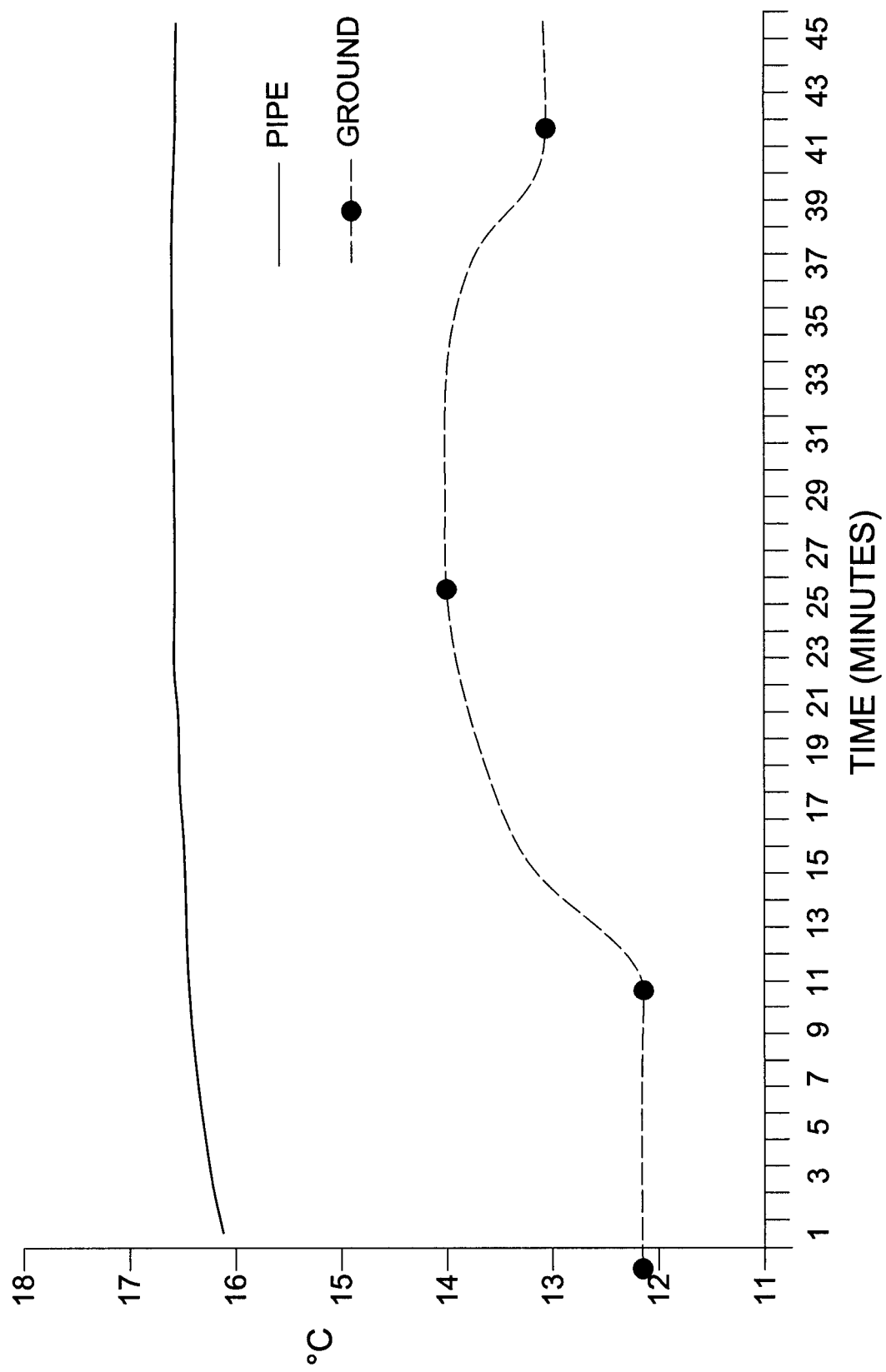
FIG. 5 is a graph showing the change in pipe temperature compared to the changing ground temperature (° C.) over time (minutes) at site SC of FIG. 4.

Shown in FIG. 5 is a graph showing the change in temperature of one section of the pipeline compared to the changing ground temperature (° C.) over time (minutes).

Figure 6:
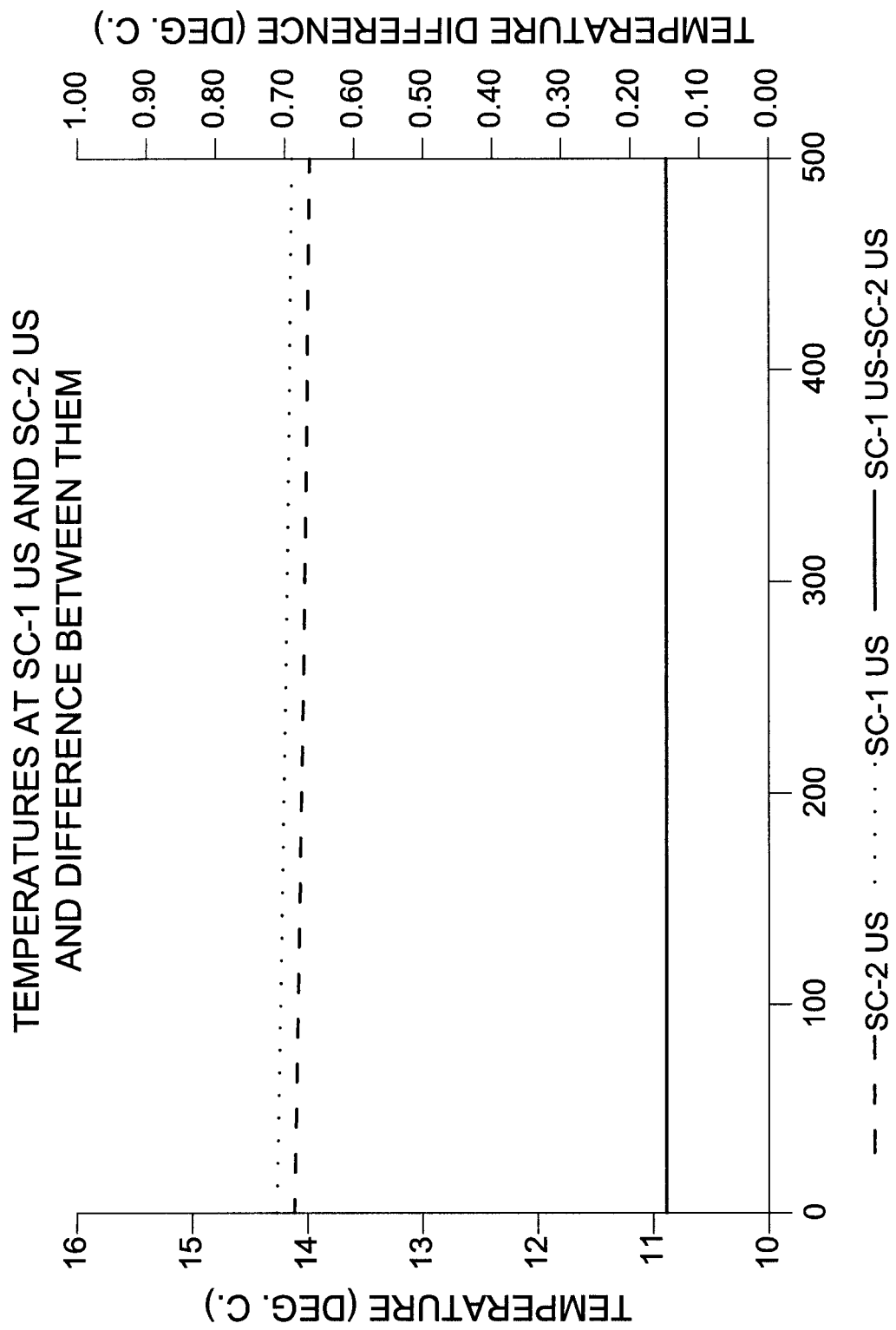
FIG. 6 is a graph showing the temperatures at sensors SC-1 and SC-2 and the temperature difference between these two sensors.

Shown in FIG. 6 is a graph showing the temperatures at sensors SC-1 US and SC-2 US and the temperature difference between these two sensors over time. The actual temperature at SC-2 US is about 14° C. and the temperature difference between SC-1 US and SC-2 is about 0.2° C. Since the distance between the two sensors is about 10 meters, the calculated the thermal gradient is 0.02° C. per meter (i.e. about 0.2/10).

Based on this, the estimated temperature at SC-3 DS (i.e. 13.76° C.) would be about 0.24° C. (i.e. 0.02° C. per meter×12 meters) less than the actual temperature at SC-2 US (i.e. about 14° C.).

Figure 7:
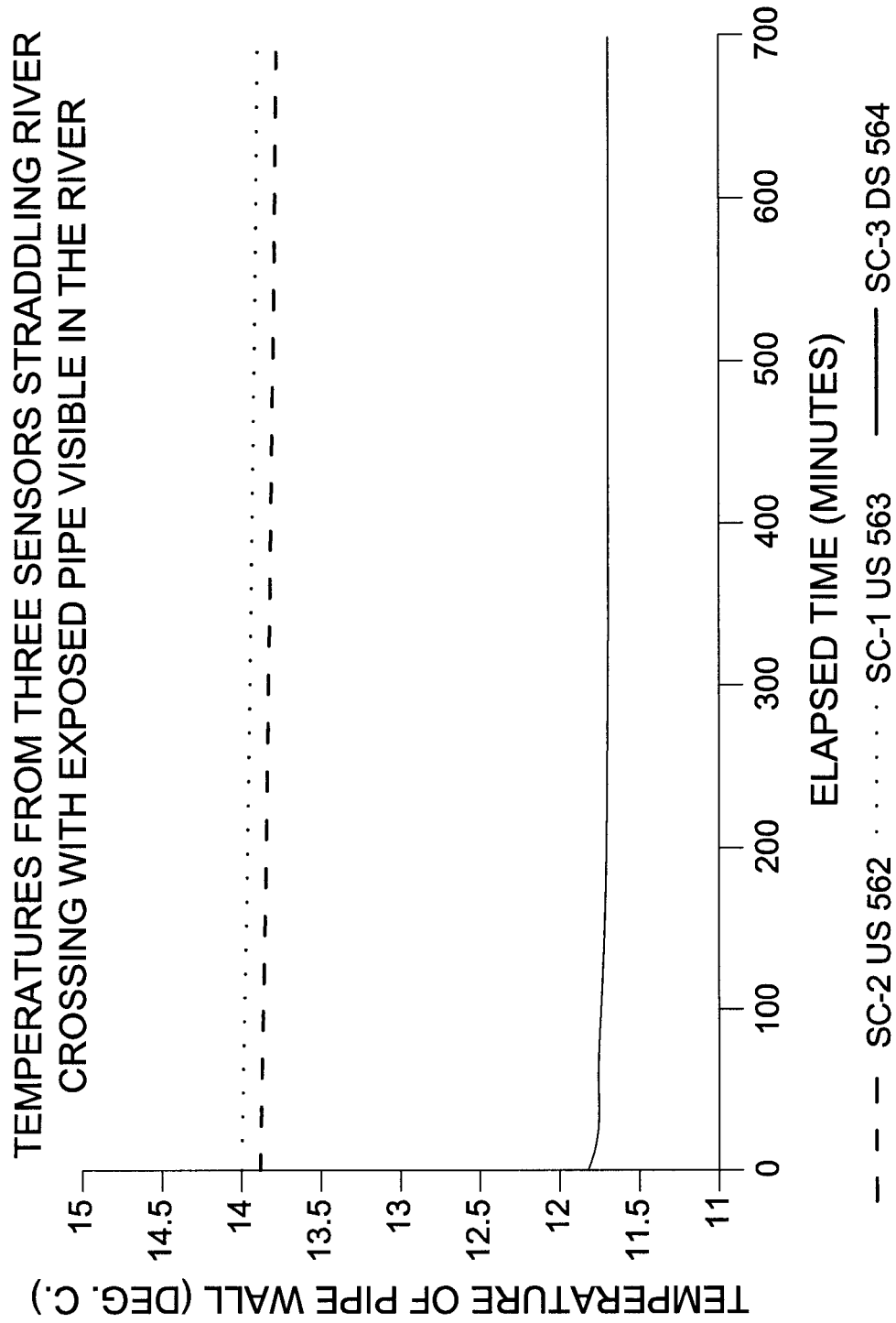
FIG. 7 is a graph showing temperature readings from the three sensors (SC-1 US, SC-2 US, and SC-3 DS)

FIG. 7 additionally shows the actual readings from SC-3 DS in addition to the readings at SC-1 US and SC-2 US. As shown, the actual temperature reading at SC-3 DS is slightly less than 12° C. which is much lower than the estimated temperature for SC-3 DS (i.e. 13.76° C.). This indicates that the pipeline or a portion of the pipeline is exposed to water at the water crossing.

Figure 8:
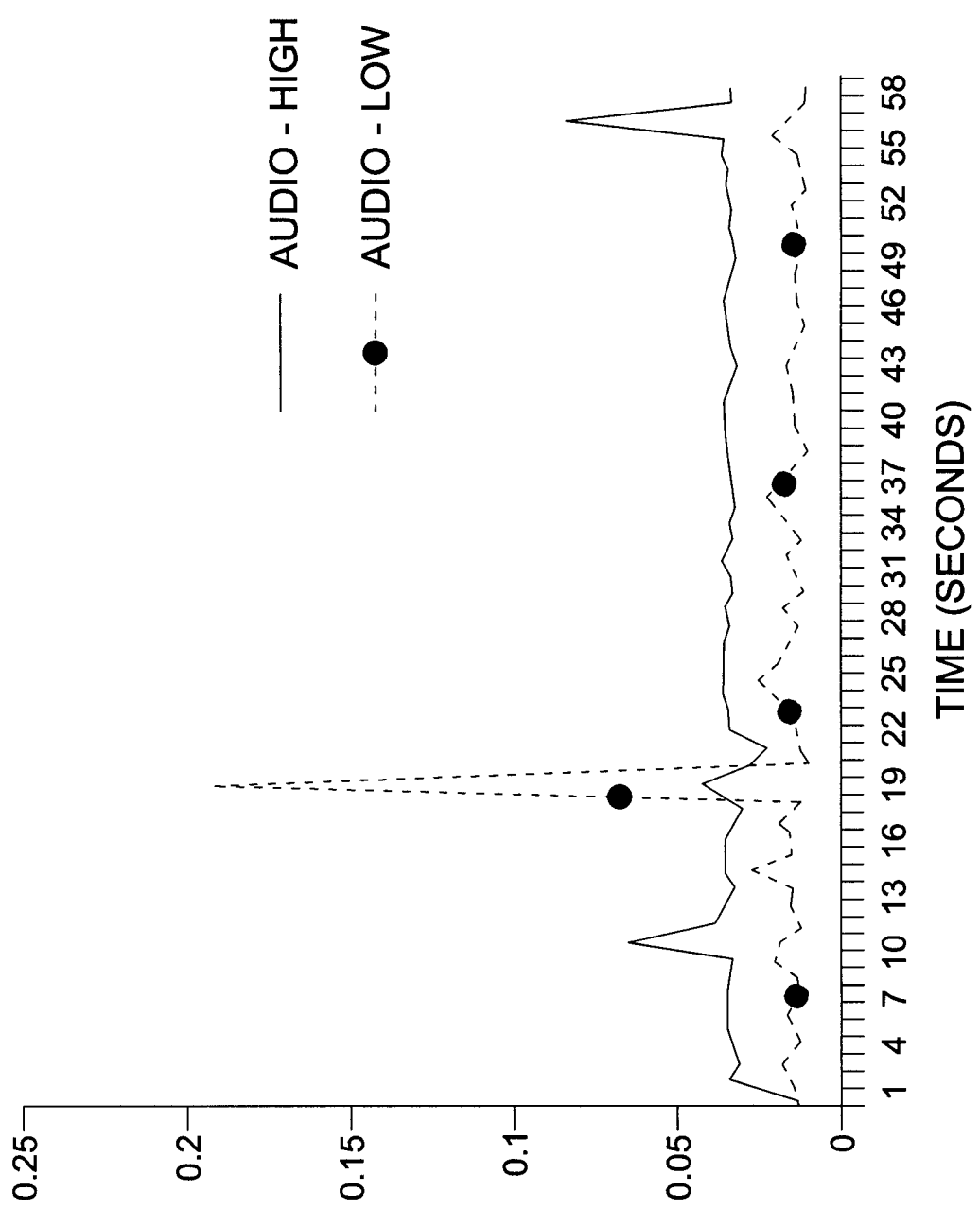
FIG. 8 is a graph showing data obtained from an acoustic sensor according to an embodiment of the present invention.

FIG. 8 is a graph showing data from an acoustic sensor placed proximal to the water crossing. The upwards deflection observed in the low frequency band (<4 kHz) at around 19 minutes confirms that debris or a rock carried in the water did contact the exposed portion of the pipeline at the water crossing. Had the pipeline not been exposed at the water crossing, there would no upwards deflection in the low frequency band detected by the acoustic sensor.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a sub combination of features which may not be explicitly described above. In addition, features from one or more of the above-described embodiments may be selected and combined to create alternate embodiments comprised of a combination of features which may not be explicitly described above. Features suitable for such combinations and sub combinations would be readily apparent to persons skilled in the art upon review of the present application as a whole. Any dimensions provided in the drawings are provided for illustrative purposes only and are not intended to be limiting on the scope of the invention. The subject matter described herein and in the recited claims intends to cover and embrace all suitable changes in technology.

The invention claimed is:

1. A system for identifying pipe exposure in a crossing of a body of water, the system comprising:
    a distal upstream sensor at a first location upstream and distal to the crossing of the body of water for obtaining a first temperature of the pipe at the first location;
    a proximal upstream sensor at a second location upstream and proximal to the crossing of the body of water for obtaining a second temperature of the pipe at the second location;
    a downstream sensor at a third location downstream from the crossing of the body of water for obtaining a third temperature of the pipe at the third location;
    a temperature estimation means for obtaining a temperature rate of change by using the first obtained temperature and second obtained temperature and the distance between the distal upstream sensor and the proximal upstream sensor, and estimating the temperature of the pipe at the third location, and identifying pipe exposure when there is a deviation between the estimated temperature and the obtained third temperature at the third location.

2. The system of claim 1 wherein the temperature estimation means comprises a computer system.

3. The system of claim 1, further comprising a water temperature sensor.

4. The system of claim 1, wherein the distal upstream sensor, the proximal upstream sensor, and the downstream sensor each comprise a signal transmission means for relaying the obtained temperature information or processed information to a site remote from the crossing.

5. The system of claim 1, further comprising a flow meter.

6. The system of claim 1, further comprising an acoustic sensor.

7. A method for identifying pipe exposure in a crossing of a body of water, the method comprising:
    obtaining a first temperature of a fluid carried in a pipe at a first location upstream and distal to the crossing of the body of water;
    obtaining a second temperature of the fluid at a second location upstream and proximal to the crossing of the body of water;
    obtaining a third temperature of the fluid at a third location downstream from the crossing of the body of water;
    generating an estimate of the temperature of the fluid at the third location by establishing a rate of change of temperature of the fluid using the obtained first temperature and the obtained second temperature and the distance between the first and second locations;
    identifying pipe exposure when there is a deviation between the estimated temperature and the obtained third temperature.

8. The method of claim 7 further comprising generating a historical database of the obtained first, second and, third temperatures.

9. The method of claim 7 further comprising accessing a databases containing topographical, geographical, and/or geological information along a route of the pipe.

10. The method of claim 7 further comprising accessing local weather information along a route of the pipe.

11. The method of claim 7 wherein the step of identifying pipe exposure comprises: accessing a historical database of the obtained first, second, and third temperatures and estimated third temperatures; comparing the obtained third temperature to the historical database of obtained third temperatures and estimated third temperatures; determining whether the obtained third temperature deviates from the historical database of obtained third temperatures; wherein it is indicative of pipe exposure when the obtained third temperature deviates from the historical database of obtained third temperatures.

12. The method of claim 11 wherein the step of identifying pipe exposure further comprises: accessing a database of topographical, geographical, and/or geological information along a route of the pipe; and determining whether the deviation at the third location is indicative of the exposure of the pipe.

13. The method of claim 7 further comprising obtaining a temperature of the body of water.

14. The method of claim 7 further comprising obtaining acoustic information from the pipe.

15. The method of claim 7 further comprising obtaining the rate of flow of the fluid.

16. The method of claim 7 wherein the obtained first, second, and third temperatures of the fluid, are obtained by obtaining the temperature of the wall of the pipeline at the first, second, and third locations.

17. A computer program comprising a non-transitory computer readable memory storing computer executable instructions which are executed by a computer perform the method steps of claim 7.

18. A method for identifying pipe exposure in a crossing of a body of water, the method comprising:
    obtaining fluid temperature of a fluid carried in a pipeline from at least two locations along the pipeline and upstream of a underwater pipeline crossing and separated by a distance sufficient to measure a difference in temperature changes;
    determining a rate of temperature change over the distance between the at least two locations;
    estimating the temperature of the fluid carried along a pipeline at a location downstream of the underwater pipeline crossing from the product of the rate of temperature change and the distance of the downstream location from a location upstream of the underwater crossing; and
    identifying pipe exposure when there is a deviation between the estimated temperature of the fluid at the location downstream of the pipeline crossing with an obtained fluid temperature at the location downstream of the pipeline crossing.

19. The method claim 18 wherein the difference is about 0.01 degrees Celsius.

* * * * *